3,552,086
SANDWICH STRUCTURAL PANEL OF
CELLULAR CORE TYPE
John W. Allen, Flossmoor, Ill., assignor to Stanray Corporation, Chicago, Ill., a corporation of Delaware
Filed Apr. 7, 1967, Ser. No. 629,266
Int. Cl. E04c 2/36
U.S. Cl. 52—618    7 Claims

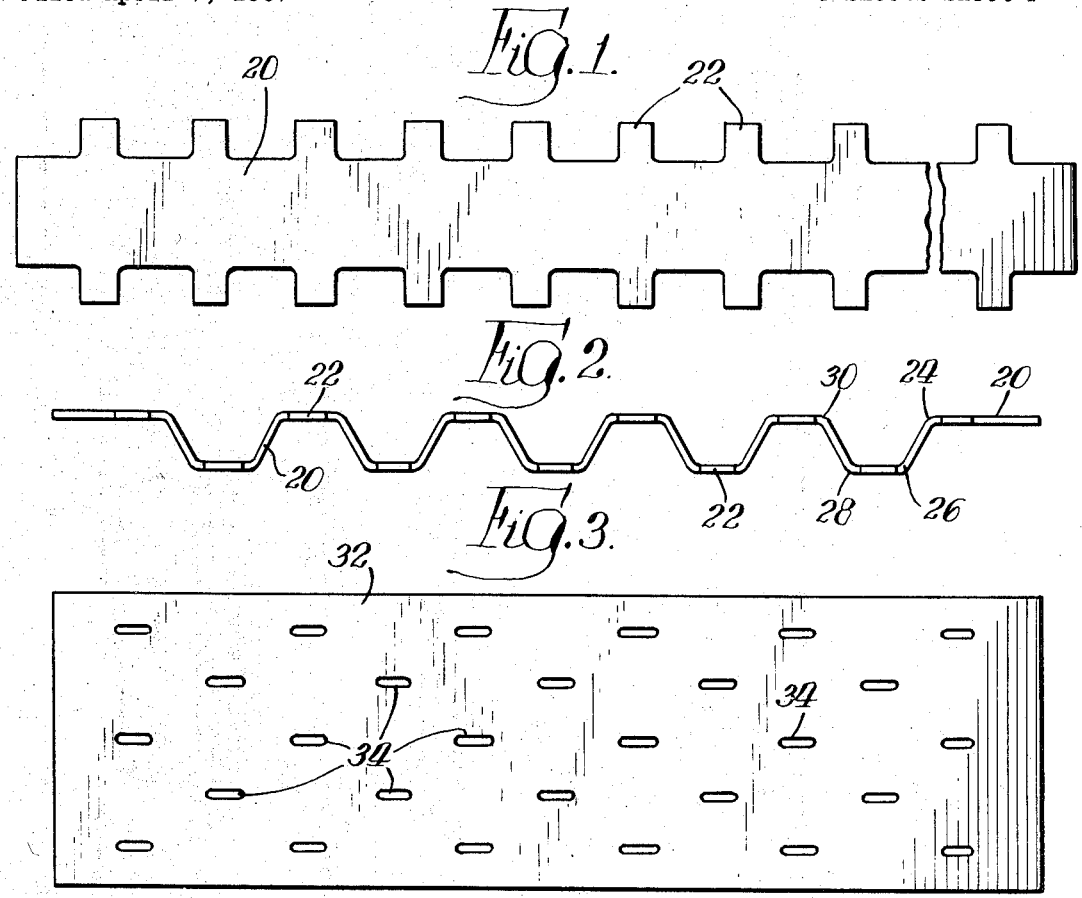
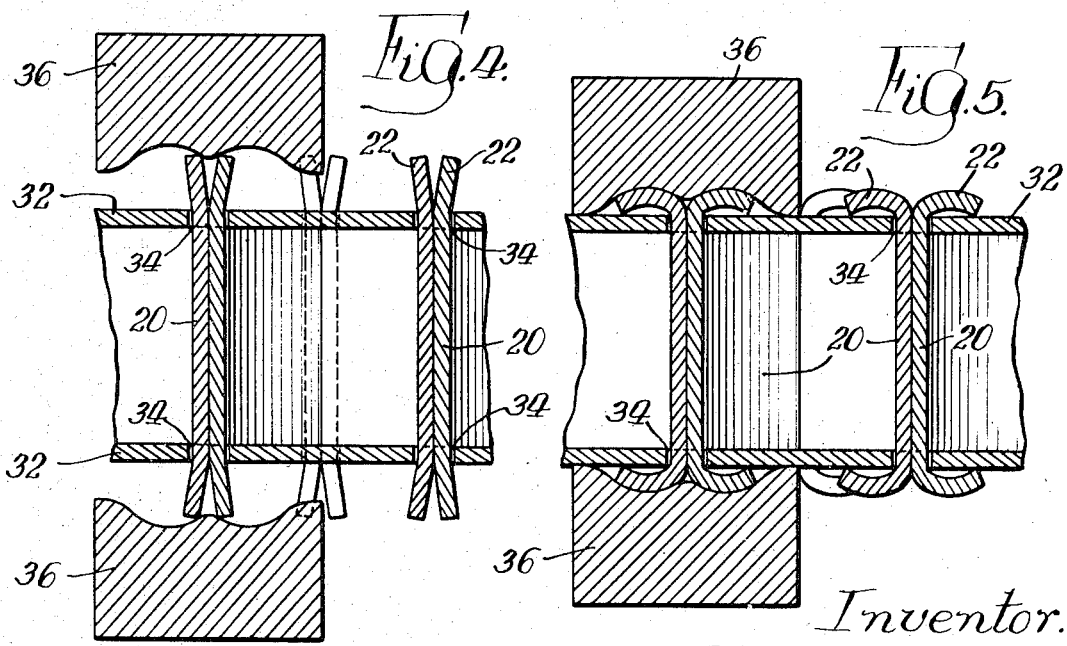

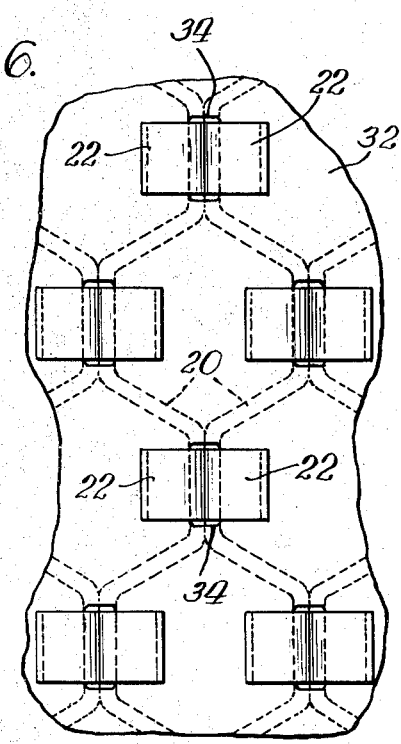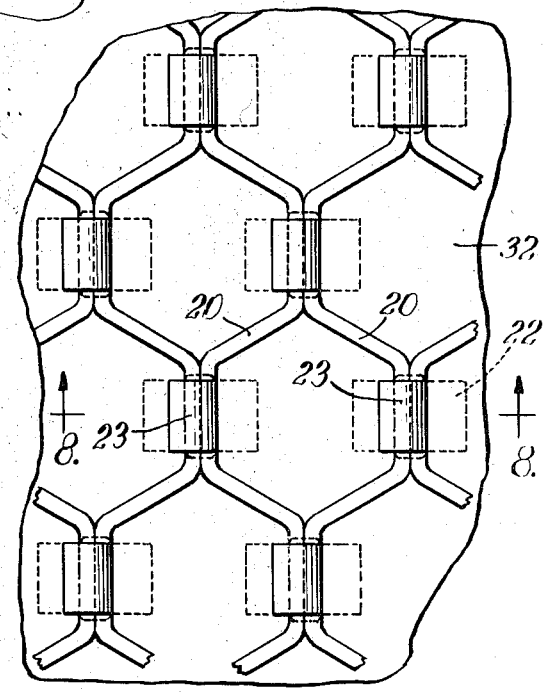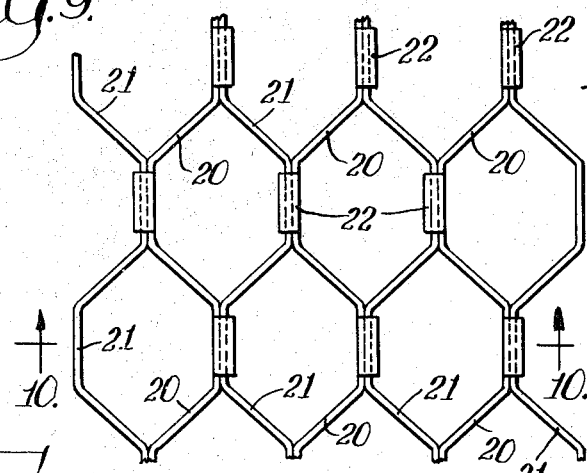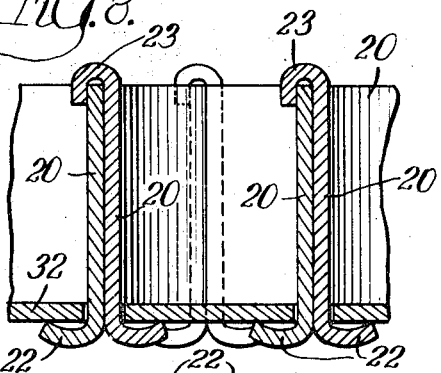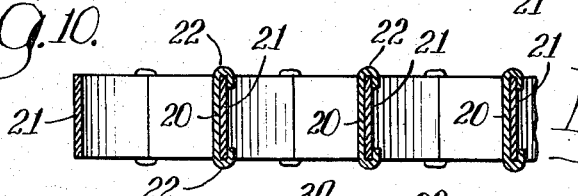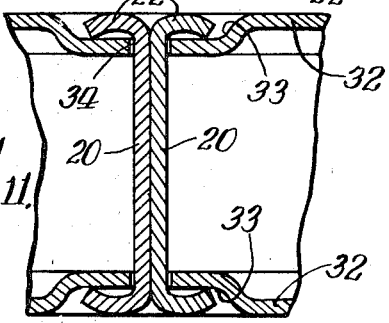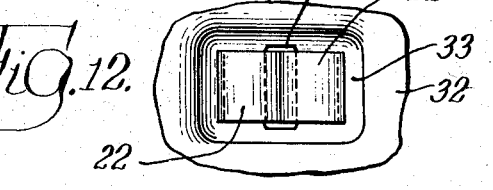

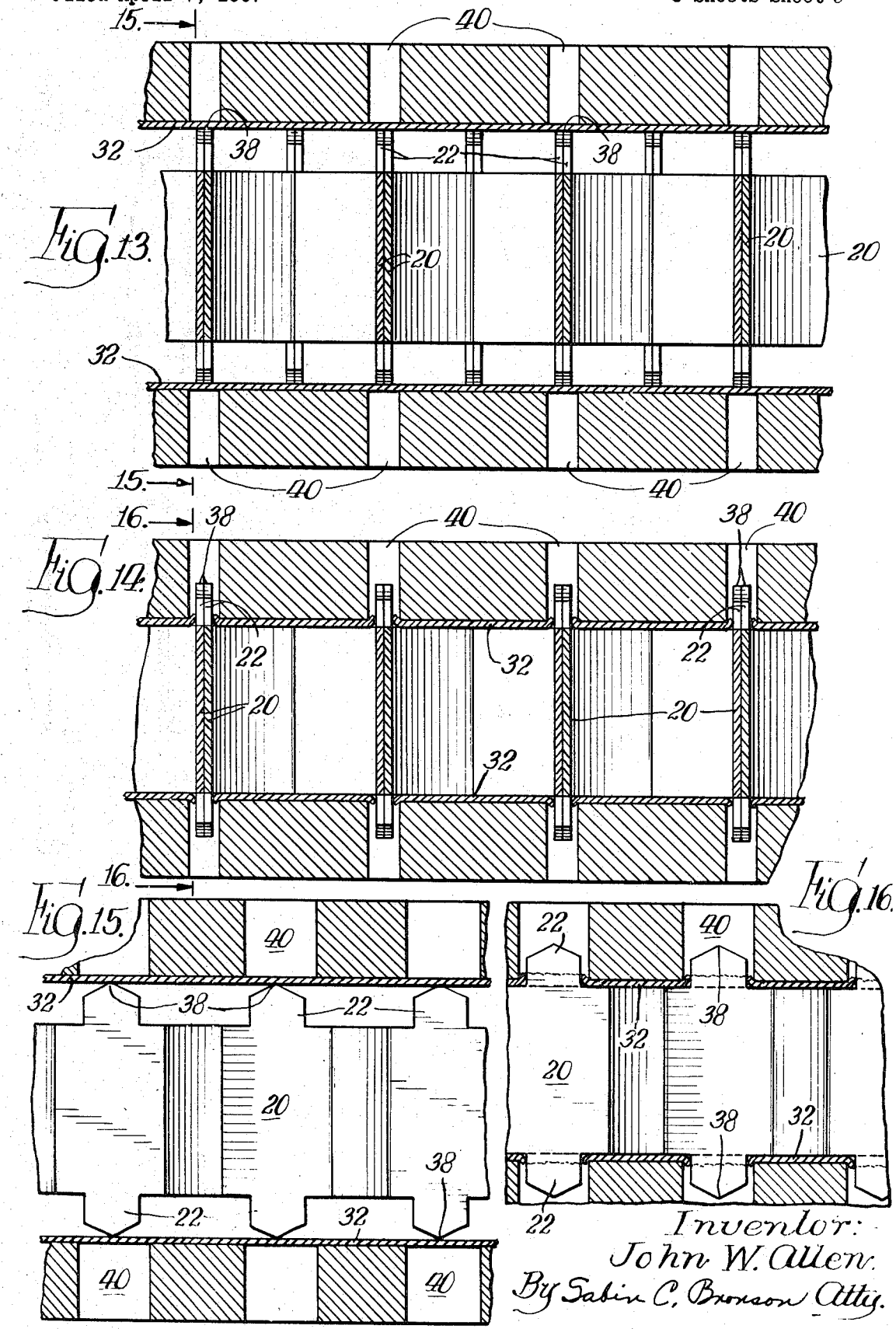

ABSTRACT OF THE DISCLOSURE

A sandwich structural panel of cellular core type wherein integral tongues or tabs are spaced along the edges of the core material which register with and project through slots in skin sheets of the panel and are folded thereover to hold the skin sheets to the core material.

BACKGROUND OF INVENTION

(1) Field of invention

The invention pertains to sandwich panels having a cellular core between two skin sheets, to a cellular core secured to one skin sheet to stiffen same, or to a cellular structure only. The feature of the invention is in the manner of securing the core strips to each other or the skin sheets to the core by a mechanical fastening rather than by the more expensive means presently used.

(2) Description of the prior art

Sandwich panels of the cellular core type are not new. For examples, see Pats. 3,086,899, 2,327,265, 2,910,153, and 2,983,038. In all of these prior patents weldments are used in the fabricaiton of the panels, and since the entire assembly is dependent for its structural integrity upon the efficacy of the means used to bond or secure the components together, panel is no stronger than the strength of the weldments. Stresses on the surface of the panel normal to its plane sufficient to deform same cause some of the weldments to give away, thus weakening the panel. Applicant's invention seeks to avoid a separation of the components even though the panel is subjected to stresses which would be sufficient to deform the panel.

SUMMARY OF THE INVENTION

Applicant's invention disclosed a sandwich panel comprising a cellular core which is constructed in a manner to have considerable strength itself as a structural member. This core may have no skin sheets or may have one or two skin sheets secured thereto by mechanical means. Said means comprise integral tabs spaced along both edges of and projecting therefrom in the same plane as the core material so as to extend through slots in a skin sheet and be folded thereover. When but one skin sheet is utilized, the tabs along one edge project through the slots in said sheet and are folded thereover, and the tabs along the other edge are folded over the edge of the adjacent strips. When two skin sheets are used, the integral tabs project through registering slots in both skin sheets and are folded thereover. Thus the components are held together by said mechanical means and to separate the components would require a stress normal to the plane of the panel to cause deformation sufficient to pull the tabs out of the slots, which can hardly be done without a complete wrecking of the panel.

BRIEF DESCRIPTION OF THE DRAWING

FIG. 1 is a plan view of a web member before forming;
FIG. 2 is an edge of FIG. 1 after forming;
FIG. 3 is a plan view showing detail of skin sheet;
FIGS. 4 and 5 show a method of press forming the sandwich construction;
FIG. 6 is a plan view of a broken portion of a panel comprising the invention;
FIG. 7 is a plan view of a broken portion of a panel showing a modified form of the invention;
FIG. 8 is a cross section on line 8—8, FIG. 7;
FIG. 9 shows a method of mechanical fastening of hex-cell web members to each other to provide a web panel;
FIG. 10 is a section on the line 10—10 of FIG. 9;
FIG. 11 is a view similar to FIG. 5, wherein embossments are provided around the holes in the skin sheets to provide a recess for the core member tabs;
FIG. 12 is a plan view of one folded-over pair of tabs in an embossment as shown in FIG. 11;
FIG. 13 is a cross section through reciprocating press dies showing unperforated skin sheets on opposite sides of a cellular core about to be forced down over said tabs.
FIG. 14 is a view similar to FIG. 13 showing the skin sheets forced down over the tabs to opposite sides of the cellular core.
FIG. 15 is a cross sectional view on the line 15—15 on FIG. 13; and
FIG. 16 is a cross sectional view on the line 16—16 on FIG. 14.

DESCRIPTION OF THE PREFERRED EMBODIMENTS

The invention concerns a sandwich panel constructed of a cellular type core with skin sheets on opposite sides of the core. The illustrations are of a hex-cell core-member, although it is apparent that the core openings may be rectangular, octagonal, or have any number of sides, circular or elliptical in plan view.

The core is made of a plurality of strips of material 20, which, as shown in FIGS. 1 and 2 particularly, are provided with spaced tabs 22 along the edges thereof which extend therefrom in the same plane as the strips 20. These strips of material 20 are provided with a regular pattern of undulations or corrugations and as at 24, adjacent an end thereof, are bent at about a 60° angle diverging from the plane of the strip for a short distance, and are then bent again as at 26 to continue a further short distance parallel to the original plane of the strip, and are again bent as at 28 to converge toward the original plane of the strip where they are again bent as at 30 to continue a short distance in the original plane of the strip. This portion of the strip then forms one-half of a hex-cell and the forming is continued in like manner throughout the length of the strip, so that when mated with another such strip, as shown in FIG. 9, hexagonal cells are formed therebetween.

The width of the strips 20 determines the thickness of the panel. Skin sheets 32 are provided, which are of about #12 gauge material and are punched with a pattern of elongated slots 34, as shown in FIG. 3. These slots are of a dimension so that the tabs 22 may conveniently extend therethrough when said skin sheets are applied to the cellular core. When the strips 20, with the spaced tabs 22 extending therefrom, are bent as above described to form a cellular core, the tabs will extend upwardly so as to fit the pattern of the slots 34 in the skin sheets. It will be noted in FIG. 6 that the tabs 22 on adjacent strips 20 are aligned and that a pair of adjacent tabs on adjacent strips project through a single slot 34 in the skin sheet.

As shown in FIGS. 4 and 5, the tabs 22—22 of the strips are then folded over the skin sheets 32 by being placed between reciprocating folding dies 36 which squeeze the tabs apart and down on the skin sheets 32. The required number of core strips are assembled in pairs so as to form the cellular areas therebetween throughout the area of the panel, and when thus formed, result in an exceptionally strong panel.

In cases where only a hollow core sheet is desired, these pairs of undulated or corrugated strips 20—20 are provided, but only one of them would have the tabs 22 extending therefrom. Thus when a corrugated or undulated tab strip 20 is mated with such a strip 21 without tabs, the tabs along one edge of the one strip 20 are folded over the meeting portion of the untabbed strip 21 and the tabs along the other edge are then folded over the other edge of the untabbed strip 21 to make a mechanical bond therewith. See FIGS. 9 and 10. In this case the tabs 22—22 of the tabbed strip are alternately folded over the meeting portions of the untabbed strips 21 on either side of the tabbed strip. These folded-over tabs the nhold the entire arrangement of strips together and makes a good mechanical bond.

When but one skin sheet 32 is used, as shown in FIGS. 7 and 8, the core material or strips 20 are provided with spaced tabs 22 along one edge only, and when mated with an adjacent strip, the pairs of tabs extend through slots 34 in the skin sheet 32 and are folded thereover to make a good bond therewith. This provides a good stiffened plate construction.

It would be possible for one of said strips 20 just described to have tabs 22 formed along both edges thereof, and said tabs along the free edge be folded over the free edge of the adjacent strip, as indicated at 23 to keep the skin sheet from hinging along a line coincident with the meeting surfaces of a pair of strips.

There may be instances where it would be desirable for the skin sheets 32 to rest in a common plane with a supporting surface, and in such instances the skin sheets are provided with embossments 33 about the slots 34. These embossments are in depth about the thickness of the material so that when the tabs are folded over, as indicated in FIG. 11, they will occur within the bounding planes of the embossments. Consequently no tab will project above the plane of the skin sheets 32.

The skin sheets 32 are obviously of thinner material than the core material 20, or at least may be of thinner material. Where the skin sheets are not more than three-fourths or 75% of the thickness of the core material, it has been found that by providing the tabs with a piercing point 38, and also providing elongated narrow slots 40 in the press dies conforming to the pattern of the tabs, the skin sheets can successfully be forced down over the pointed tabs 38 as the tabs pierce their way through the skin sheets and into the elongated slots 40 in the dies. The start of the piercing operation is shown in FIGS. 13 and 15, and the finish of said operation is shown in FIG. 14 and 16.

In this manner it is not necessary to perforate the skin sheets to apply said sheets over the core, thereby saving the operation of perforating the skin sheets.

The operation of this invention will be clearly comprehended from a consideration of the foregoing description of the mechanical details thereof taken in conjunction with the drawings. It is understood that minor variations from the form of the invention disclosed herein may be made without departure from the spirit and scope of the invention.

I claim:

1. In a structural panel, the combination of a cellular type core comprising a plurality of pairs of undulating strips, longitudinally spaced tabs at each of the nodes of said undulations extending upwardly from the edges of at least one of said pairs of said strips, said pairs of strips being adjacent and engaging each other at the nodes of said undulations whereby to provide cellular openings therebetween, said tabs being foldable to form a mechanical bond.

2. The structure of claim 1, said tabs extending from one strip only of each pair of strips and also extending downwardly from the edges and being foldable over the other strip at their meeting nodes.

3. The structure of claim 1, said tabs on said at least one strip also extending downwardly and coplanar with said strips and being foldable over the other strip.

4. The structure of claim 3, and a perforated skin sheet applied to one side of said core with the extending tabs projecting through respective perforations, said other of said strips having tabs projecting from at least one of the edges also projecting through said perforations in said skin sheet, said tabs being folded over said skin sheet to provide a mechanical bond with said core.

5. The structure of claim 4, the perforations of the skin sheet conforming in pattern with the spacing of said tabs so as to register therewith when the sheet is applied to said core.

6. The structure of claim 4 wherein embossments are provided around each perforation in said skin sheet so that the folded-over portion of said tabs will occur within the bounding planes of the skin sheet.

7. The structure of claim 4, and a perforated skin sheet applied to the other side of said core with the extending tabs projecting through respective perforations, and wherein said other of said strips includes tabs projecting from both edges thereof.

References Cited

UNITED STATES PATENTS

| | | | |
|---|---|---|---|
| 1,324,982 | 12/1919 | Rogers | 29—513 |
| 1,868,108 | 7/1932 | Lachman | 29—513 |
| 2,772,757 | 12/1956 | Hammond | 161—68 |
| 2,996,790 | 8/1961 | Trafford | 29—513 |
| 3,033,086 | 5/1962 | Marsden | 29—513 |
| 3,144,204 | 8/1964 | Bohahon | 29—513 |

FOREIGN PATENTS

| | | | |
|---|---|---|---|
| 649,311 | 6/1964 | Belgium | 52—618 |

PRICE C. FAW, JR., Primary Examiner

U.S. Cl. X.R.

29—513; 161—68